United States Patent [19]

Johannesen

[11] 4,244,451
[45] Jan. 13, 1981

[54] DISC BRAKE AND PIN ASSEMBLY THEREFOR

[75] Inventor: Donald D. Johannesen, South Bend, Ind.

[73] Assignee: The Bendix Corporation, Southfield, Mich.

[21] Appl. No.: 23,930

[22] Filed: Mar. 26, 1979

[51] Int. Cl.³ .............................................. F16D 65/02
[52] U.S. Cl. .................................................... 188/73.3
[58] Field of Search .................... 188/72.4, 73.3, 73.5, 188/73.6

[56] References Cited

U.S. PATENT DOCUMENTS 4,051,927  10/1977  Karasudani ........................ 188/73.3

FOREIGN PATENT DOCUMENTS 2250843  10/1972  Fed. Rep. of Germany .......... 188/73.3
Ad.12273-
86  5/1964  France ..................................... 188/73.3

Primary Examiner—Duane A. Reger
Attorney, Agent, or Firm—Paul David Schoenle; Ken C. Decker

[57] ABSTRACT

A disc brake assembly provides a torque member which is juxtaposed with a rotor for the purpose of movably supporting a caliper. The caliper cooperates with a pair of friction elements to urge the latter into engagement with the rotor during a brake application as the caliper moves relative to the torque member. In order to movably support the caliper relative to the torque member, the torque member and caliper include a pair of matching slots for receiving a pair of pins. A pair of split cylindrical sleeves are also received within respective slots to engage the torque member and caliper. The sleeves define bores which receive the pins to form a clearance therewith. Consequently, during a braking application one of the sleeves is contracted radially to transmit braking torque from the caliper to the torque member via the one sleeve and its corresponding pin. The sleeves and pins maintain the caliper in spaced relation to the torque member at all times.

5 Claims, 4 Drawing Figures

DISC BRAKE AND PIN ASSEMBLY THEREFOR

BACKGROUND OF THE INVENTION

In U.S. Pat. No. 4,084,665, a disc brake provides a torque member for movably supporting a caliper via a pair of pins. The pins carry elastomeric members to resiliently dispose the caliper in spaced relation to the torque member and the elastomeric members are deformed during a braking application to abut the caliper with the torque member.

The caliper is movable by reaction forces during a braking application in an axial direction until both friction elements completely engage the rotor. Thereafter, the caliper is rotatable in the direction of the rotor to abut the torque member.

In U.S. Pat. No. 3,388,774 a pair of pins carry sleeve which are engageable with a torque member to transmit braking torque from the pins to the torque member. The sleeves are disposed within an opening on the caliper so as to remain spaced from the caliper.

SUMMARY OF THE INVENTION

The disc brake of the present invention provides a cylindrical split sleeve in each matching slot between the torque member and caliper. Each sleeve receives a pin to form a clearance therewith and resiliently engages the caliper and torque member to dispose the caliper in spaced relation to the torque member. During a braking application the caliper slides on the sleeves until a pair of friction elements are fully engaged with a rotor whereupon the caliper moves in the direction of the rotor through a small distance. This small movement of the caliper with the rotor causes one of the sleeves to contract radially so as to take up the clearance with its corresponding pin. When the clearance is taken up by the contraction of the sleeve, the small movement of the caliper with the rotor is terminated. Torque developed by the caliper is transmitted to the torque member through the one sleeve and pin even though the caliper is spaced from the torque member when the one sleeve is contracted into engagement with the one pin.

It is an object of the present invention to provide a pin and sleeve between a torque member and caliper in order to support the caliper in spaced relation to the torque member at all times.

It is a further object of the present invention to provide a split sleeve which resiliently engages the caliper and the torque member. The split sleeve is radially contracted into full engagement with a pin during a braking application to transmit torque to the torque member while at the same time maintaining the caliper spaced from the torque member.

DETAILED DESCRIPTION

Figure 2:
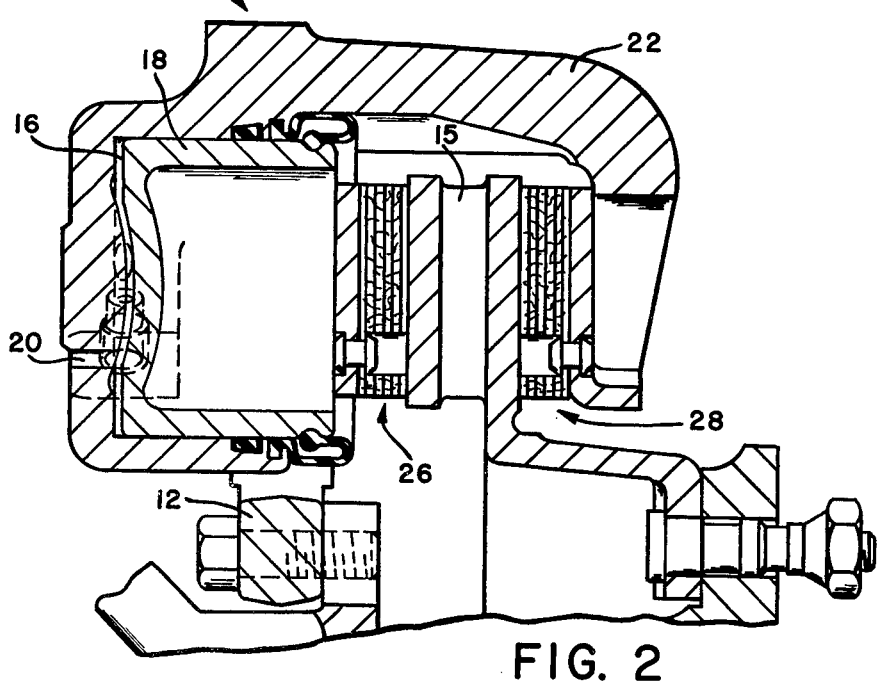
FIG. 2 is a cross-sectional view taken substantially along line 2—2 of FIG. 1.

Turning to FIG. 2, a torque member 12 movably supports a caliper 14 for axial movement relative to a rotor 15. The caliper forms a cavity 16 for receiving a piston 18. An inlet 20 communicates pressurized fluid to the cavity to control movement of the piston 18 within the cavity. A bridge portion 22 of the caliper extends over the outer periphery of the rotor 15 and a pair of friction elements 26 and 28 are movable by the piston 18 and the bridge 22, respectively, into engagement with the rotor to retard rotation of the latter.

Figure 1:
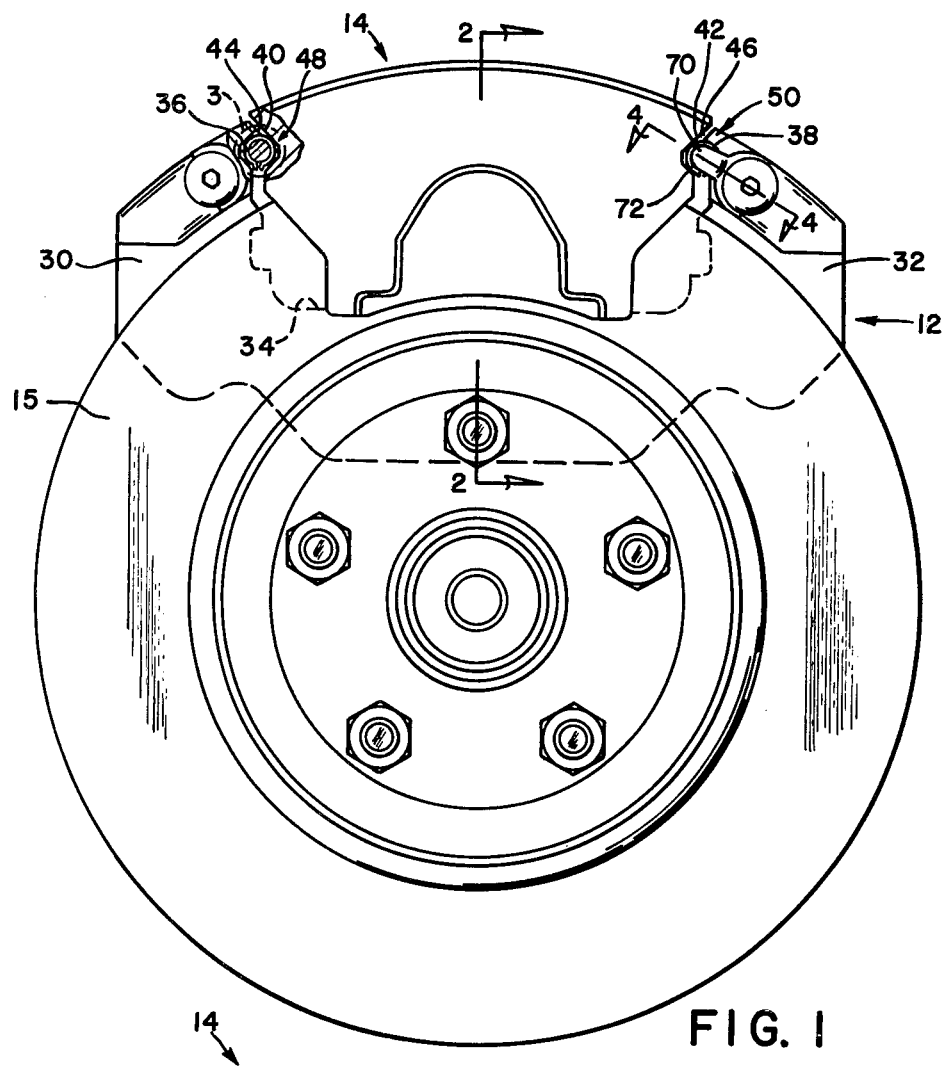
FIG. 1 is a side elevation view of a disc brake made pursuant to the present invention.

In FIG. 1, the torque member 12 is bifurcated to define a pair of arms 30 and 32 which form a recess 34 for receiving the caliper 14. The arms are provided with slots 36 and 38 and the caliper is provided with slots 40 and 42. The matching slots 36 and 40 and 38 and 42 cooperate to form axially extending apertures 44 and 46 for receiving pin assemblies 48 and 50. The pin assembly 48 is substantially identical to the pin assembly 50 so that the description with respect to pin assembly 48 is equally applicable to pin assembly 50.

Figure 3:
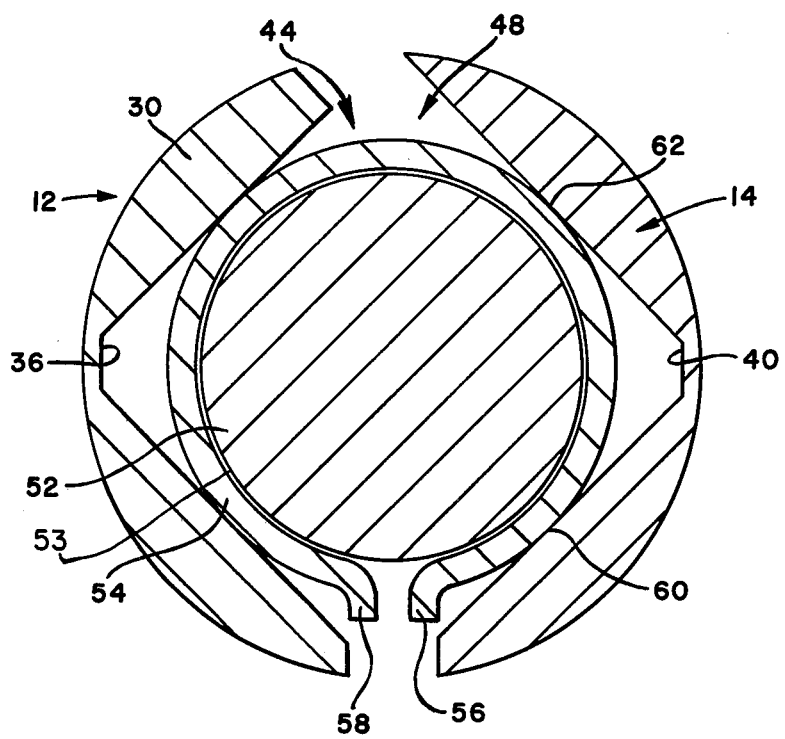
FIG. 3 is an enlarged view of the encircled portion of FIG. 1.

Turning to FIG. 3, the pin assembly 48 comprises a pin 52 and a split cylindrical sleeve 54. In order to insert the sleeve 54 into the axially extending aperture 44, the sleeve is contracted radially so that in the installed position the sleeve is resiliently engageable with the caliper 14 and the torque member 12 to suspend the caliper in spaced relation to the torque member. The sleeve 54 includes projections 56 and 58 which are engageable with the caliper and torque member, respectively, to prevent rotation of the sleeve 54 within the aperture 44. The pin 52 includes a diameter which is smaller than the bore of the sleeve when the latter is in the aperture 44. Consequently, a radial clearance 53 exists between the sleeve 54 and the pin 52.

During a braking application the piston is moved within the cavity to urge friction element 26 into engagement with the rotor 15. Increasing pressure within the cavity 16 causes the caliper 14 to move axially so as to urge the friction element 28 into engagement with the rotor 15. The movement of the caliper in the axial direction is provided by the sliding contact between the sleeve 54 and the caliper 14 at 60 and 62 in FIG. 3. When the friction elements are substantially engaged with the rotor 15, the caliper 14 is rotated or moved slightly in the direction of rotation of the rotor. Assuming a counterclockwise rotation for the rotor in FIG. 1, the caliper in FIG. 3 will move to the left to radially contract the sleeve 54 until the sleeve completely takes up the radial clearance with the pin 52 to fully engage the latter. Thereafter, torque developed by the caliper is transmitted to the torque member 12 via the sleeve 54 and pin 52 even though the radially contracted sleeve and pin maintain a spacing between the caliper and torque member 12. While the sleeve 54 of pin assembly 44 is radially contracted during a brake application for the counterclockwise rotating rotor, it is understood that a corresponding sleeve of pin assembly 50 is radially expanded.

Figure 4:
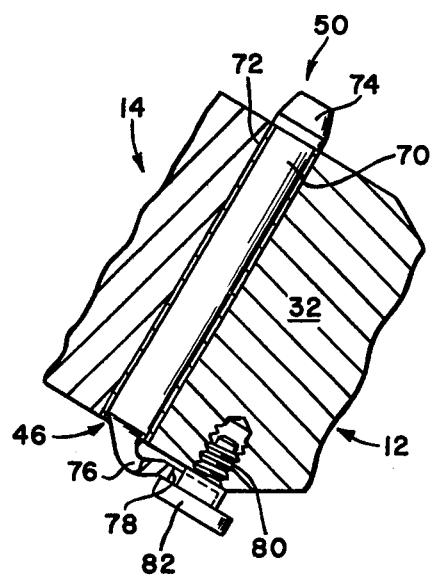
FIG. 4 is a cross-sectional view taken substantially along line 4—4 of FIG. 1.

In FIG. 4, the pin assembly 50 comprises a pin 70 and a split cylindrical sleeve 72, substantially identical to the pin 52 and sleeve 54 of pin assembly 48. The pin 70 includes an enlarged end 74 and an integrally formed flange 76 which extends transversely from a longitudinal body portion of the pin. The flange 76 defines a cutout 78 through which a bolt 80 extends and the bolt is secured to the torque member arm 32. A head 82 on the bolt 80 opposes the flange 76 to prevent the bolt from withdrawing from the aperture 46. The sleeve 72 is radially expanded to pass over the enlarged end 74 when the sleeve is attached to the pin 70 and the latter is remote from the aperture 46. In its free state the sleeve inner diameter is smaller than the outer diameter of the enlarged end 74 so that the sleeve opposes the enlarged end 74 and the flange 76 to remain connected with the pin 70. The pin and its connected sleeve are then disposed within the aperture 46.

Although the foregoing description proceeds with reference to the accompanying drawings, there are many variations and/or modifications which are feasible by one skilled in the art. These variations and/or modifications are included within the scope of the appended claims.

I claim:

1. In a disc brake assembly having a torque member disposed adjacent a rotor, a caliper movable relative to the rotor in order to urge a pair of friction elements into engagement with the rotor, and a pin assembly movably supporting the caliper relative to the torque member, the improvement wherein the pin assembly includes a sleeve engageable with the caliper and the torque member, said sleeve comprising a cylinder with an axially extending split, said cylinder defining a bore for receiving a pin element which forms a clearance with said cylinder bore wall, and said axially extending split permitting said cylinder to contract radially into engagement with said pin during a braking application to transmit torque from the caliper to the torque member via said split cylinder and said pin element.

2. The disc brake assembly of claim 1 in which the caliper and torque member include matching slots for receiving the pin assembly and said cylinder includes at least one radially extending projection defining said axially extending split, said projection also cooperating with said torque member or said caliper to limit rotation of said cylinder within said matching slots.

3. In a disc brake assembly having a torque member, a rotor rotating relative to said torque member, a caliper movable axially relative to said rotor and cooperating with a pair of friction elements to urge said pair of friction elements into engagement with said rotor, at least one sleeve engageable with said caliper and said torque member to support said caliper for movement axially relative to said torque member and said rotor, said sleeve defining a bore and having an axially extending split over the length thereof, and a pin disposed within said bore forms a clearance with the walls of said sleeve bore, said caliper rotating in the direction of rotation of said rotor when said friction elements are engaged with said rotor to radially contract said sleeve and take up the clearance with said pin.

4. The disc brake assembly of claim 3 in which said caliper and said torque member include substantially matching slots and said sleeve is disposed within said matching slots, said sleeve including at least one projection which forms the split in said sleeve to permit contraction of said sleeve, and said projection is engageable with said caliper or said torque member to limit rotation of said sleeve within said matching slots.

5. A disc brake assembly having a torque member juxtaposed relative to a rotatable member, a pair of friction elements engageable with said rotatable member to retard rotation thereof, a caliper cooperating with said pair of friction elements to urge the same into engagement with said rotatable member during a brake application, said torque member and said caliper including substantially matching slots, a pair of pin assemblies disposed within respective slots and engageable with said torque member and said caliper, said pair of pin assemblies comprising sleeves with axially extending splits and bores for receiving pin elements which define radial clearances with said sleeves, said axially extending splits permitting said split sleeves to be radially contracted for disposition within said matching slots, and said caliper being movable with said rotor during the brake application to further radially contract one of said sleeves and to permit expansion of said outer sleeve.

* * * * *